Patented Jan. 30, 1945

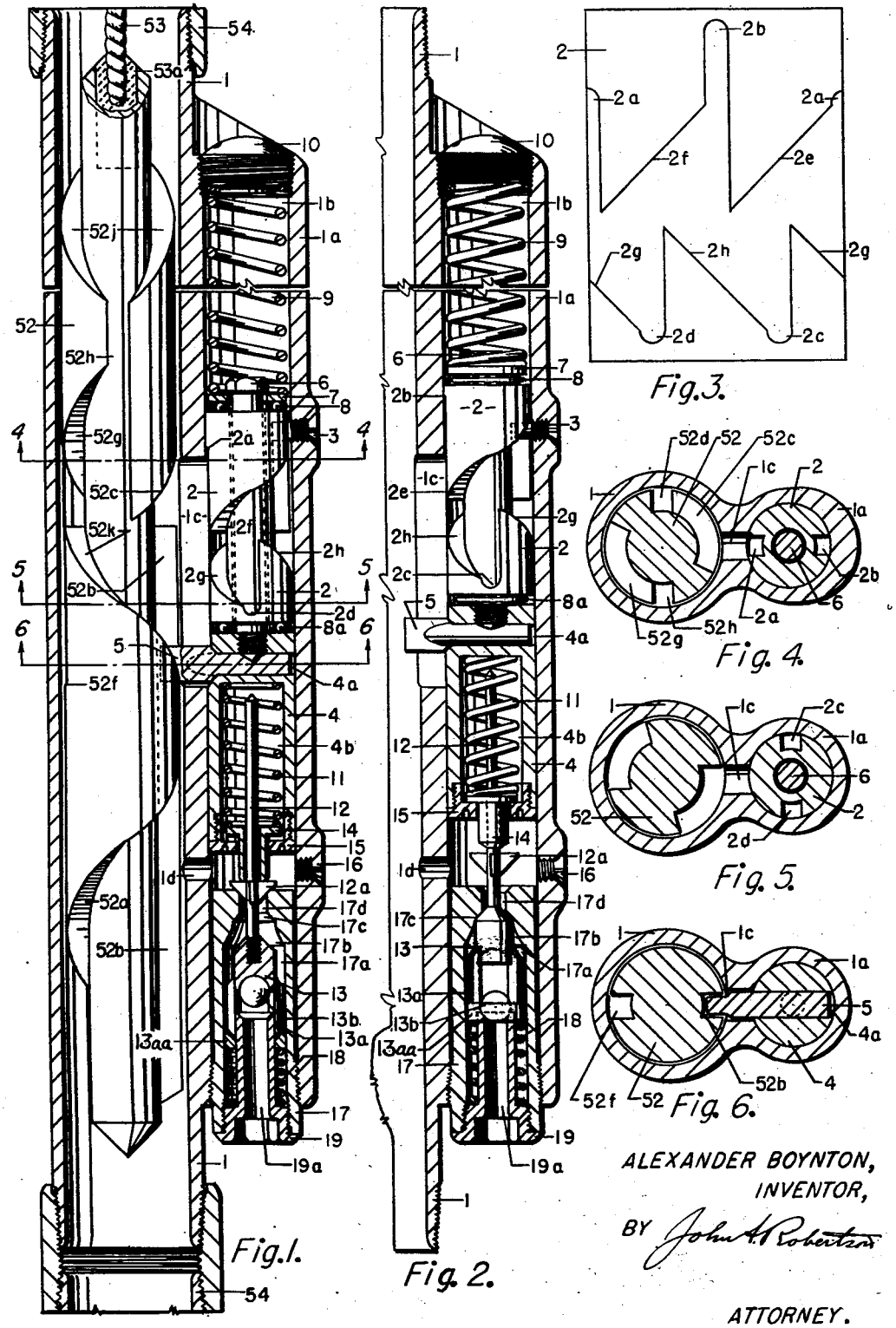

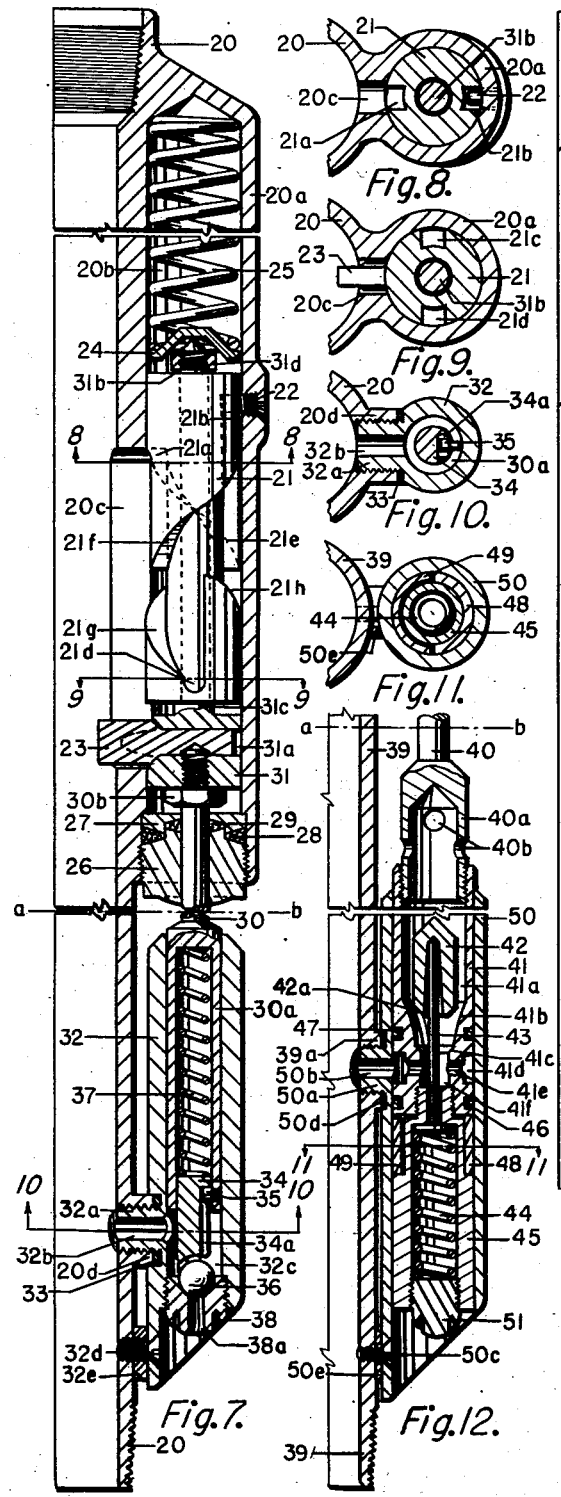
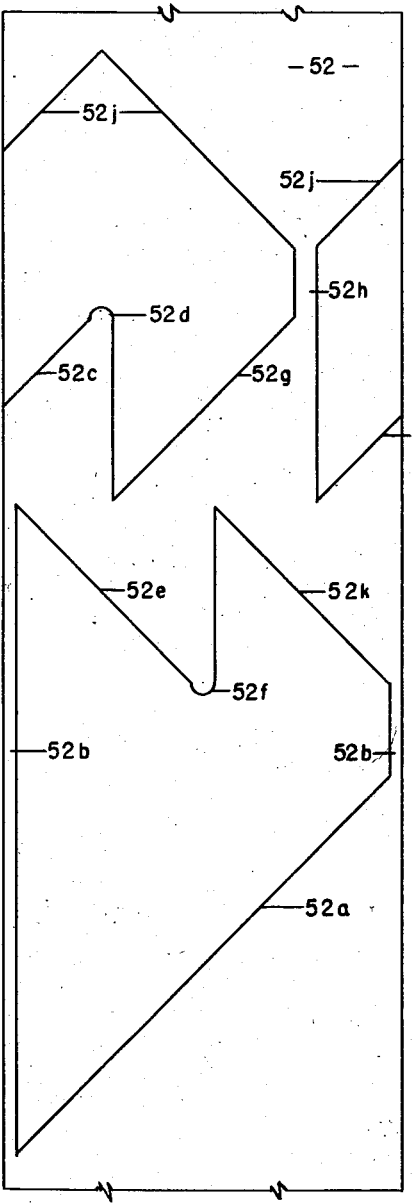
Fig.13.
ALEXANDER BOYNTON,
INVENTOR,
BY John A. Robertson
ATTORNEY.

2,368,406

UNITED STATES PATENT OFFICE 2,368,406

REMOTELY CONTROLLED FLOW VALVE

Alexander Boynton, San Antonio, Tex.; Sida S. Martin executrix of said Alexander Boynton, deceased Application December 6, 1941, Serial No. 421,934

26 Claims. (Cl. 103—233)

My invention relates to remotely controlled flow valves for wells.

The principal object is to provide a flow valve that can be opened or closed selectively by means of a tool on a cable operated from the ground surface and which tool may be removed from the well in order to leave the flow tubing unobstructed.

Another object is to provide a series of valve controlled spaced openings in the tubing of a well, a selective one or more of said valves being open while the others are closed selectively.

An important object is to supply a flow valve especially adapted to expel well liquid by heads intermittently and which will cut off the admission of pressure fluid under slugs of well liquid when the slugs have been lightened, due to partial expulsion from the well.

Another object is to improve the ordinary automatic opening and to the frequently uncertain closing of the now generally used automatic flow valves by substituting therefor a manually controlled valve opening and closing means of positive action.

Another object is to provide a flow device especially adapted to deep wells because of its positive operation resulting in tubing withdrawals being seldom necessary.

Another object is to provide a remotely controlled flow valve which does not restrict the tubing passage.

A further object is to provide a series of flow valves having the advantages set out in the foregoing objects and which, in addition thereto, can be quickly and inexpensively adapted for flowing a well through the casing instead of through the tubing.

Other related objects are to provide remote controls for valves in cooling plants, ventilating systems, pipe lines, refineries, mines, production testing devices, well cementing equipment, and all other valves requiring remote control, including means for discharging liquids and gases at predetermined locations in warfare. Any defensive system involving the release of poison gas is rendered more effective if the valves used in releasing the gas are remotely controlled. Thus they may be opened with the operator at a safe distance.

I attain the foregoing objects by means of a piston-like actuator in a lateral shell upon a nipple adapted to be connected into the eduction tubing of a well. The actuator has a series of external slots, pockets, and helically inclined cam surfaces adapted to impart rotary movement to it by contacting a stationary pin in the shell during longitudinal movements of the actuator which movements are caused by a cable operated releasing connection engageable with a pin in the actuator; whereby the actuator will cause a differential valve, adapted to control the flow of pressure fluid into the tubing, to be opened under the influence of said pressure fluid, or closed, as will appear more fully in the following specification and the accompanying drawings, in which—

Fig. 1 is mainly a longitudinal section through the preferred embodiment of the device showing the pressure fluid intake valve open with the releasing connection and portions of the device in outside view.

Fig. 2 is a partial longitudinal section through the preferred embodiment of the device showing the pressure fluid intake valve closed, portions of the inner parts being shown in outside view.

Fig. 3 is a diagram of the slots, pockets, and helically inclined cam surfaces of the actuator.

Fig. 4 is a cross section on the line 4—4, Fig. 1.

Fig. 5 is a cross section on the line 5—5, Fig. 1.

Fig. 6 is a cross section on the line 6—6, Fig. 1.

Fig. 7 is mainly a longitudinal section through a modified construction, some of the parts being shown in outside view.

Fig. 8 is a cross section on the line 8—8, Fig. 7.

Fig. 9 is a cross section on the line 9—9, Fig. 7.

Fig. 10 is a cross section on the line 10—10, Fig. 7.

Fig. 11 is a cross section of another modified construction, this view being taken on the line 11—11, Fig. 12.

Fig. 12 is a longitudinal section through a portion of the modified construction shown cross sectioned in Fig. 11, the remainder of this construction being the same as shown in Fig. 7 above the line a—b.

Fig. 13 is a diagram of the slots, pockets, and helically inclined cam surfaces of the releasing connection.

Similar reference characters are employed to designate similar parts throughout the several viefs of each embodiment.

Figure 14:
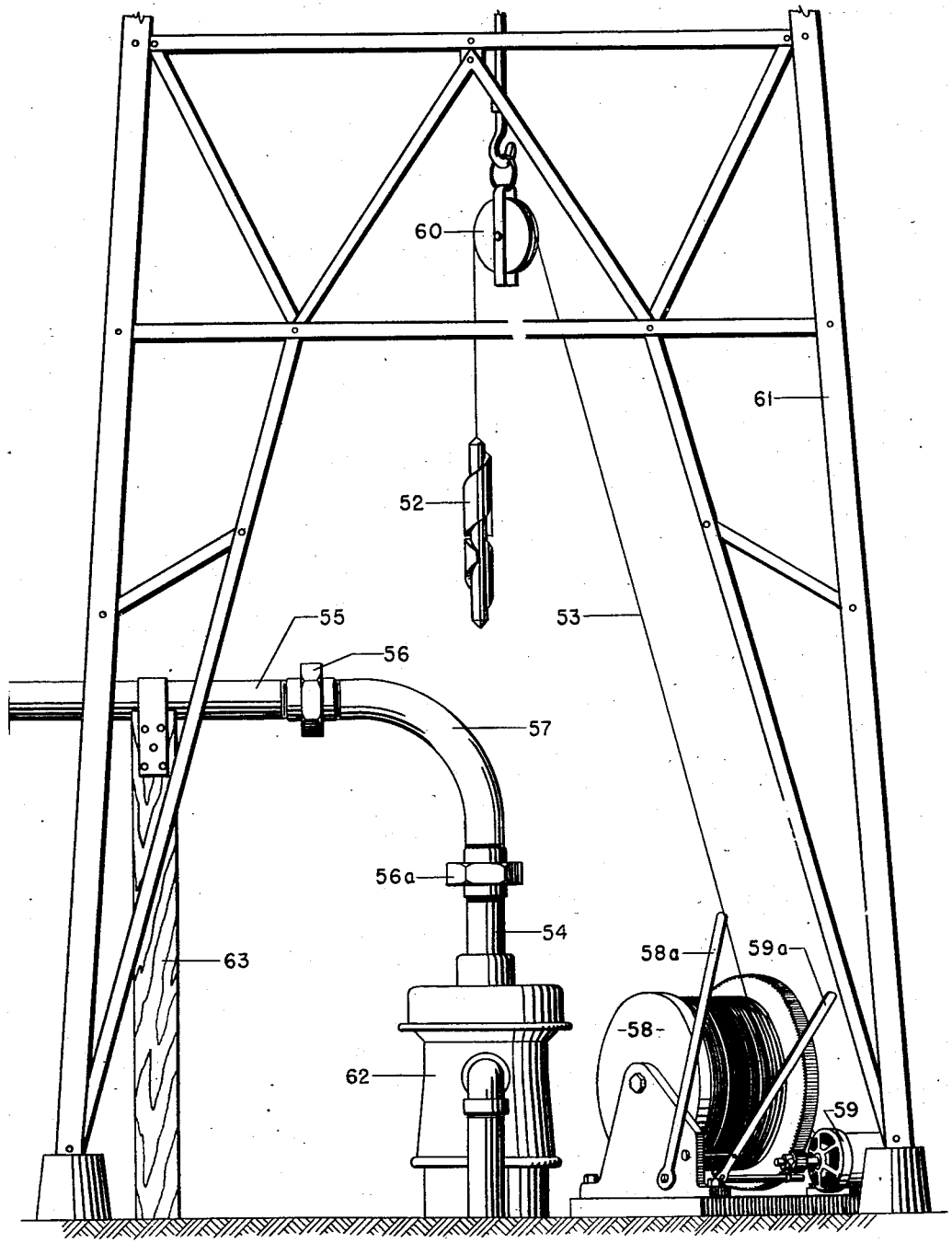
Fig. 14 is an above ground view of a typical installation showing the well, operating tool, cable, reel, and motor.

In Figs. 1 and 2, the nipple 1, having the lateral slot 1c and the pressure fluid intake port 1d, is adapted to be connected at intervals into the eduction tubing 54 of a well. The lateral shell 1a, which may be cast of steel integrally with the nipple 1, has the smooth bore 1b within which the actuator 2 and the actuator pin housing 4 are slidable. The housing 4 has the cross bore 4a which closely receives the actuator pin 5, having a head slidable within the slot 1c of the nipple 1 and extending a short distance, such as one-fourth inch, within the axial passage through the nipple. The guide pin 3 is secured firmly in the shell 1a and extends thereinto far enough to be engaged within and upon the pin pockets and inclined cam surfaces of the actuator, as will appear further on.

The axle bolt 6 is received with slight clearance within an axial opening through the cylindrical actuator 2 and has threaded engagement with the housing 4. The pointed lower end of this bolt engages within a conical depression on the actuator pin 5, whereby the pin is secured firmly within the housing 4. The washer 7 is engaged under the head of the bolt 6 and upon the thrust bearing 8 which urges the actuator 2 downward by force of the actuator spring 9, having slight clearance around it and being confined within the bore 1b by the plug 10 employed to close the upper end of the shell 1a. The thrust bearing 8a is confined between the actuator 2 and the housing 4, and the thrust bearing 8 is confined between the actuator 2 and the washer 7, the head of the bolt 6 having slight clearance with the washer 7 in order that the bearings 8 and 8a will be free.

The differential spring 11, free within the axial chamber 4b of the housing 4, is confined therein by the spring support 15 secured to said housing. The sleeve 14, slidable within the spring support 15, has its head engaged between this support and the differential spring 11. The plunger chamber sleeve 17, secured within the shell 1a, has formed within it the plunger chamber 17a, the metering chamber 17b, the axial pressure fluid passage 17d, and the closure seat 17c formed around the lower end of the passage 17d. The plunger 13, which preferably should be a casting having its upper end formed into a valve engageable with the seat 17c, has proper clearance around it for pressure fluid and has the fins 13a and the ring 13aa engaged upon the plunger seating spring 18 which is secured within the lower portion of the chamber 17a by the intake nipple 19 having the intake passage 19a and being threadedly engaged within the lower end of the sleeve 17. This nipple protects the spring 18 from the corrosive action of pressure fluid entering the device through the intake passage 19a. The screw 16 is employed to close the opening made in drilling the port 1d.

The plunger rod 12, secured to the plunger 13, has the arms 12a adapted to engage upon the sleeve 17, in order to position the plunger in spaced relation to the seat 17c when the device is open to intake pressure fluid, as in Fig. 1. The upper end of the rod 12 is slidable through the sleeve 14 and the fins 13a of the plunger are slidable within the chamber 17a for the purpose of guiding the plunger to concentrically engage the seat 17c and thereby close the path of pressure fluid through the device during high differentials. The differential spring 11 transmitting its force through the sleeve 14 resiliently urges the plunger 13 away from its seat 17c when the guide pin 3 is engaged within the deep upper pin pocket 2b, as appears in Fig. 1, and the spring 18 resiliently urges the plunger to engage its seat when the pin 3 is engaged within the shallow upper pin pocket 2a, as appears in Fig. 2.

The check valve 13b, formed to be partially received within the lower end of the plunger 13, is adapted to be forced upward, as appears in Fig. 1, while the device is intaking pressure fluid. This valve is adapted also to engage a seat formed upon the upper end of the intake nipple 19, as appears in Fig. 2, when the device is not intaking pressure fluid.

The actuator assembly is adapted to become stationary in two positions. One of these positions is when the guide pin 3 is contained in the deep pin pocket 2b, this being the open position of the device, as in Fig. 1. The other stationary position of the actuator is when the pin 3 is engaged within the shallow pin pocket 2a, this being the closed position of the device, as in Fig. 2. The actuator spring 9 constantly urges the actuator downward toward one of these positions.

It will be observed in Fig. 3 that the upper pin pockets and helically inclined cam surfaces are rotatably offset with relation to the position of the lower pin pockets and helically inclined cam surfaces; that is, the shallow upper pin pocket 2a is opposed by the lower helically inclined cam surface 2g; the deep upper pin pocket 2b is opposed by the lower helically inclined cam surface 2h; the lower pin pocket 2c is opposed by the upper helically inclined cam surface 2e; and the lower pin pocket 2d is opposed by the upper helically inclined cam surface 2f.

The inclined cam surfaces 2e, 2f, 2g, and 2h, and the lower pin pockets 2c and 2d manipulate the actuator in its various contacts with the guide pin 3, as will be explained under operation of Figs. 1 and 2.

*Sub-surface installation*

By way of illustrating the best presently known mode of applying the invention, it will be understood that any of the devices herein disclosed may be installed in series at spaced intervals in the eduction tubing 54 of a well. The distance between proximate devices may be, for example, 200 to 500 feet. Any desired number of devices may be employed, series of three to seven being adapted to meet the most ordinary well conditions.

*Operation, Figs. 1 and 2*

In all forms of the invention, each vertical movement of the actuator is caused by a cable pull upon the actuator pin or by the actuator spring thereafter forcing the actuator in the opposite direction. All rotational movements of the actuator are caused by the stationary guide pin acted upon by the helically inclined cam surfaces of the actuator during its vertical movements. The vertical and rotary movements of the actuator are coincidental. Whenever the actuator is pulled upward, one of the lower inclined cam surfaces contacts the guide pin to cause partial rotation of the actuator. Whenever the actuator is forced downward by the actuator spring, one of the upper inclined cam surfaces contacts the guide pin to cause continued limited rotation of the actuator.

The path of pressure fluid through the open device and into the tubing 54 is via the intake passage 19a, the plunger chamber 17a, the pressure fluid passage 17d, and the pressure fluid intake port 1d, in the order named.

The actuator pin 5, which extends slightly into the flow passage through the nipple, is adapted to be releasably engaged by the operating tool 52, Figs. 1 and 13, in a manner to be described further on.

To close the device, it being open, as in Fig. 1 wherein the guide pin 3 is engaged within the deep upper pocket 2b, proceed as follows: Attach the operating tool 52 to the actuator pin 5 and pull the actuator 2 upward. The lower inclined cam surface 2h will contact the guide pin 3 and will cause the actuator to be rotated slightly until this pin will be engaged within the lower pocket 2c. Then, release the pull upon the actuator pin 5; whereupon the actuator spring 9 will force the actuator downward, causing the upper inclined cam surface 2e to contact the pin 3; whereby the actuator will be rotated further until the shallow upper pocket 2a will contain the pin 3, as in Fig. 2. In this position pressure fluid urges the plunger 13 against the valve seat 17c, thereby cutting off the flow of pressure fluid. The upper position of the sleeve 14 removes restraint of this upward movement of the plunger 13.

To open the device, it being closed as in Fig. 2, wherein the guide pin 3 is engaged within the shallow upper pocket 2a, proceed as follows: Attach the operating tool 52 to the actuator pin 5 and pull the actuator 2 upward. The lower inclined cam surface 2g will engage the guide pin 3 and cause the actuator to be rotated slightly until this pin will be engaged within the lower pocket 2d. Then, release the pull upon the actuator pin 5; whereupon the spring 9 will force the actuator downward, causing the upper inclined cam surface 2f to contact the pin 3; whereby the actuator will be rotated further until the deep upper pocket 2b will contain the pin 3 again, as in Fig. 1. In this position the sleeve 14 limits upward movement of the plunger 13. Thus this plunger cannot engage the seat 17c under the influence of pressure fluid and the passage for pressure fluid is kept open.

It will be understood that the differential spring 11 will be stronger than the plunger seating spring 18 when the spring 11 is compressed as in Fig. 1. When the device is open, as in Fig. 1, the spring 11 compresses the spring 18. When the device is closed, as in Fig. 2, the spring 18 forces the plunger to engage the closure seat 17c to stop the flow of pressure fluid through the passage 17d after the spring 11 has been raised and the sleeve 14 has been removed from contact with the arms 12a of the plunger rod 12.

Manifestly the spring 18 can be moved into the chamber 4b and given proper contact means with the upper end of the rod 12 to lift the plunger so as to close the passage 17d when the actuator is raised.

When the device is open, as in Fig. 1, high differentials will cause the plunger 13 to close upon the seat 17c and cut off the flow of pressure fluid into the device. For example, if a pressure fluid differential of 100 pounds in the plunger chamber 17a will seat the plunger, it is apparent that the device will close its intake whenever there is less than 100 pounds of load in the tubing above the open device, and that the pressure fluid inlet will open again whenever a load of more than 100 pounds reappears in the tubing above the open device.

When the device is closed, as in Fig. 2, it is obvious that the force of the spring 18 is aided by the differential force in causing the plunger 13 to remain firmly engaged upon its seat 17c.

If, between flowing operations, however, well liquid entrapped within the tubing by a check valve therein should outweigh the pressure fluid force exterior of any device, the check valve 13b will prevent the escape of liquid through such device.

The operating tool

An operating tool is necessary to the utility of this invention and the best means known to this applicant whereby the devices illustrated in Figs. 1, 2, 7, and 12 can be operated is shown at 52. This tool comprises a series of slots, pockets, and helically inclined cam surfaces formed upon the surface of a one piece rod or shaft-like member most plainly appearing in Figs. 1 and 13. It may be lowered into the tubing 54 by means of the cable 53 upon which it is shown secured by the lead, solder or babbitt 53a. The operating tool, free to be rotated, thereby slightly twisting the proximate portion of the cable with it, is shunted axially by its inclined surfaces contacting the actuator pin 5, whereby the tool, as it is reciprocated, alternately engages and releases this pin. After each pull upon the pin, the tool may be lowered through the device and then withdrawn from the well or it may be lowered to the next device for similar action.

The outstanding operative characteristic of the tool 52 is as follows: It will land upon each device upon which it is lowered. Then one pull upon the tool will open the device if closed or close the device if open. The tool then may be lowered through the device which has last been pulled upon, after which it may be either raised out of the well or lowered to the next device to open it if closed or to close it if open, as was stated for the action of the tool upon the valve above.

When the tool 52 encounters the actuator pin 5, the lower guide slope or cam surface 52a will rotate the tool to receive the pin within the entrance slot 52b. The first upper helically inclined cam surface 52c will rotate the tool to engage the pin within the upper pin pocket 52d, which arrests the downward movement of the tool. Then, when the tool is raised by the cable, the first lower helically inclined cam surface 52e will cause the lower pin pocket 52f to contain the pin; whereby the actuator 2 will be raised as the cable is pulled upon and the guide pin 3 will be contained in one of the upper pockets 2a or 2b; thereby opening the device if the pin contact was changed from the shallow upper pocket 2a to the deep upper pocket 2b and closing the device if this change was from the deep pocket 2b to the shallow pocket 2a. When the cable pull is released, the second upper helically inclined cam surface 52g will rotate the tool so as to cause the exit slot 52h to pass over the pin. The tool is then free to be lowered to the next device or to be withdrawn through the device or devices above it.

In raising the tool 52 through the devices, the upper guide slopes or cam surfaces 52j will rotate the tool to receive the actuator pin 5 within the slot 52h. The second lower helically inclined cam surface 52k then contacts the actuator pin and rotates the tool slightly until the slot 52b will cause the tool to clear the pin.

It will be noted that one cable pull upon the tool 52 will change the device from open to closed, and vice versa. Manifestly, two cable pulls, spaced by a release of the tool, will enable the tool to be passed through any device; thereby leaving that device in the same position as before being pulled upon the first time. Thus the first pull changes the original condition of the device, whatever it might be, but the second pull restores the device to its original condition. Any change in the device is only temporary and of the briefest duration, if it is desired to lower the tool past a device and leave it in the condition in which it is found.

For illustration, it will be assumed that there are several devices in a well, and that the upper device is open, all other devices being closed. Now, to close the upper device and open the third device, for example, proceed as follows: Lower the operating tool 52 until it contacts the upper device and pull once. That will close the upper device. Then, lower the tool to the second device which is closed and which it is desired to leave closed. Pull upon this device twice. In doing so land the tool upon the device and pull once. Then lower the tool through it and raise the tool above it. Then lower the tool upon the device again and pull once more. Then lower the tool through the second device which will leave it closed. Then land the tool upon the third device which is closed and pull once. That will open it. Then lower the tool through the third device.

While I have shown and referred to pin pockets in the operating tool as described, it will be understood that such pockets are employed only as a matter of nicety in finishing the tool and that they may be omitted without impairing the utility thereof.

It is apparent that the operating tool may have its ends reversed by attaching the cable upon the other end, and that the tool then will pass through successive devices without stopping as the tool is lowered. When such a tool is withdrawn, each device above it will be manipulated as was described for the tool shown as it is lowered.

In Fig. 14, illustrating a typical aboveground installation, I show the operating tool 52 suspended over the well tubing 54 upon the cable 53 supported by the pulley 60 hanging from the derrick 61. The reel 58, having the brake 58a, is operated by the motor 59 having the clutch 59a. The reel and motor may be positioned at any convenient place near the casing head 62 for the purpose of opening or closing the devices in the well.

In providing that the tool 52 may be used quickly, the tubing 54 is connected to the flow line 55 by means of the long radius nipple 57 and the unions 56 and 56a. By disconnecting the union 56a and turning the nipple 57 out of the way, the tool 52 may be lowered instantly into the well for manipulating the valves in a manner which has been described under operation. The post 63 supporting the flow line 55 provides that the union 56a may be reconnected quickly.

A convenient and economical source of power for operating the tool 52 may be provided by installing a generator in a car employed upon the oil lease.

Manifestly, the motor, reel, cable, and operating tool may be moved easily from one well to another in order to avoid unnecessary duplication.

It is apparent that the device illustrated in Figs. 1 and 2 may be converted into a casing flow device by closing the port 1d and opening the passage closed by the screw 16, at the same time closing the passage 19a and providing another opening into the nipple 1 below the plunger 13. Such a device would employ the tubing 54 as an induction means for pressure fluid and the annular space between the tubing and casing would become the eduction conduit for well liquid.

First modification

Fig. 7, illustrating the first modified construction, differs from the preferred embodiment in the differential valve mechanism and other minor structural details only.

The nipple 20, having the lateral shell 20a, the slot 20c, and the lateral boss 20d, is adapted to be connected into the eduction tubing of a well, in like manner as the nipple 1 in Figs. 1 and 2. The actuator 21, having the rod-like projection 31b of the actuator pin housing 31 extending loosely through it and secured with end clearance to it by the nut 31d, is slidable within the smooth bore 20b of the shell 20a. The guide pin 22, firmly secured in the shell, extends into the bore 20b of the shell where the upper helically inclined cam surfaces 21e and 21f and the lower helically inclined cam surfaces 21g and 21h of the actuator are slidable over the guide pin 22. Likewise the shallow upper pin pockets 21a and 21b and the lower pin pockets 21c and 21d are engageable with this pin (see Figs. 7, 8, and 9); whereby the actuator controls the open and closed positions of the ball valve 36, as will be explained more fully under operation of Fig. 7.

The actuator spring 25 within the bore 20b constantly urges the actuator 21 downward by urging the circular plate 24 to engage the pointed end of the projection 31b and also urges the other end of the actuator to engage upon the enlargement 31c of the projection 31b. Thus, the actuator is free to move axially without imparting appreciable torque to the plate 24 or to the actuator pin housing 31.

The valve control rod 30, slidable through the gland sleeve 26 and the gland roof 27 and through the packing 29, is secured within the housing 31 and is locked there by the lock nut 30b. This rod has a pointed end engageable within a depression in the actuator pin 23, whereby this pin, having its head slidable in the slot 20c, is secured firmly within the cross bore 31a. The gland roof 27, which may be pressed in against an annular shoulder within the shell 20a, as appears in Fig. 7, has the packings 28 and 29 pressed against it by the gland sleeve 26 having threaded engagement within the lower extremity of the shell.

The valve housing 32 has the lateral boss 32a threadedly secured within the lateral boss 20d of the nipple 20, this engagement being rendered hermetic by the gasket 33 between the boss 20d and the housing 32. This housing is parallel with the shell 20a and is secured in such relation by means of the screw 32d engaged within the nipple 20 and by the spacer washer 32e impinged between the housing and the nipple.

The rod 30 has the depending tubular extension 30a slidable within the pressure fluid passage 32c of the valve housing 32. The differential spring 37 is confined within this tubular extension by the valve stop rod 34, confined therein and restrained from rotation by the retainer pin 35 secured in the extension 30a and slidable in the longitudinal slot 34a of the stop rod 34.

The valve retainer 38, secured within the lower end of the housing 32, has the intake opening 38a and supports the ball valve 36. This valve is adapted to raise the rod 34, compressing the differential spring 37, and to close the pressure fluid intake port 32b extending into the nipple 20. Such movement of the valve takes place during the prevalence of high differentials when the device is in the pressure fluid intaking position, that is, when the deep upper pocket 21b of the actuator is engaged about the guide pin 22.

In the other, or closed position of the device, the shallow upper pocket 21a of the actuator will be engaged about the guide pin 22. The tubular extension 30a then will be withdrawn high enough for the lower end of the valve stop rod 34 to completely clear or uncover the pressure fluid intake port 32b, whereupon the draft of pressure fluid seeking to enter the device will force the ball valve 36 to close the opening 32b.

It will be observed that the relative position of the pin pockets and inclined cam surfaces of the actuator 21 are identical with the slots and inclined cam surfaces of the actuator 2 in Figs. 1, 2, and 3.

Operation, Fig. 7

The path of pressure fluid into the tubing 54 through the open device is via the intake opening 38a, the pressure fluid passage 32c, and the pressure fluid intake port 32b.

The actuator pin 23, similar to the pin 5 in Figs. 1 and 2, is adapted to be releasably engaged by the operating tool 52.

To close the device, it being open as in Fig. 7 wherein the guide pin 22 is engaged within the deep upper pocket 21b: Attach the operating tool 52 to the actuator pin 23 and pull the actuator 21 upward. The lower inclined cam surface 21h, corresponding to the inclined cam surface 2h in Fig. 3, will contact the guide pin 22 and will cause the actuator to be rotated slightly until this pin will become engaged within the lower pocket 21c (see Fig. 9), this pocket corresponding to the pocket 2c in Fig. 3. Then, release the pull upon the actuator pin 23; whereupon the actuator spring 25 will force the actuator downward, causing the upper inclined cam surface 21e to contact the pin 22; whereby the actuator will be rotated further until the shallow upper pocket 21a will contact the pin. At that time, the valve stop rod 34 will be raised so that the ball valve 36 will be forced by pressure fluid to close the pressure fluid intake port 32b. To again open the device, attach the operating tool 52 to the actuator pin 23 and pull the actuator 21 upward. The lower inclined cam surface 21g will engage the guide pin 22 and cause the actuator to be rotated slightly until this pin will be engaged within the lower pocket 21d. Then, release the pull upon the actuator pin 23; whereupon the actuator spring 25 will force the actuator downward and will cause the upper inclined cam surface 21f to contact the pin 22; whereby the actuator will be rotated further until the deep upper pocket 21b will contain the pin again, as in Fig. 7.

When the device is open as in Fig. 7, the differential spring 37 will be compressed by the ball valve 36 during high differentials at which times the pressure fluid will cause this valve to close the pressure fluid intake port 32b. Whenever the differential decreases below the force required to compress the spring 37 far enough to allow the valve 36 to close the port 32b, the device will resume intaking pressure fluid in a manner well known to the art.

If, between flowing operations, the pressure fluid force exterior of the device should become less than the force of well liquid entrapped within the tubing by the customary check valve installed proximate the lower end of the tubing, the valve 36 will seat upon the valve retainer 38 and prevent drainage out of the tubing through the device.

While I have explained the operating tool 52 in connection with Figs. 1, 2, and 3, it will be understood that the operation will be the same as applied to Fig. 7, wherein the pockets 21a, 21b, 21c, and 21d correspond to the similar pockets 2a, 2b, 2c, and 2d, respectively in Figs. 1, 2, and 3; while the helically inclined cam surfaces 21e, 21f, 21g, and 21h in Fig. 7 correspond to the helically inclined cam surfaces 2e, 2f, 2h, and 2g in Figs. 1, 2, and 3.

To convert the device illustrated in Fig. 7 from a tubing flow means to a casing flow means, move the ball valve 36 to above the opening 32b, close the inlet opening 38a, and provide another opening through the sleeve 32 above the ball valve.

Second modification

In Fig. 12, I illustrate a second modified construction wherein the valve mechanism constitutes the only departure from the construction illustrated in Fig. 7. The device shown partially in Fig. 12 may be considered as being completed above the line a—b by the construction shown above the line a—b in Fig. 7.

The nipple 39, which may be similar to the nipple 20 in Fig. 7, has the lateral boss 39a, into which the lateral boss 50a of the cylinder or valve assembly housing 50 has threaded connection, the gasket 50d being employed to make the conection hermetic. The cylinder or assembly housing 50 is secured parallel with the nipple 39 by the screw 50c and the spacer washer 50e.

The valve control rod 40, corresponding to the rod 30 in Fig. 7, has a depending tubular extension 40a having the lateral openings 40b. This tubular extension is secured to the plunger housing shell 41 which, in turn, is secured to the differential spring housing sleeve 45. The slide valve 49 has slight side clearance between the sleeve 45 and the cylinder 50 and also has slight end clearance between the shell 41 and the sleeve 45, this end clearance being provided by the slide valve spacer band 48 upon the opposite side of the sleeve 45 where it is locked between the shell 41 and the sleeve 45. The shell 41 has formed within it the plunger chamber 41a, the metering chamber 41b, the axial passage 41f, the lateral openings 41e, and the annular recess 41d.

The shell 41 and the sleeve 45 form a piston-like unit slidable within the cylinder 50. The slide valve 49 is adapted to close the pressure fluid intake port 50b when the actuator shallow upper pocket 21a is engaged about the guide pin 22, the showing in Fig. 12 indicating that the guide pin is engaged in the deep upper pocket 21b.

The plunger 42, having its lower end formed into the valve 42a adapted to engage the closure seat 41c formed around the passage 41f, is supported in the chamber 41a and has its lower end held resiliently in the upper portion of the metering chamber 41b by the plunger rod 43, having its head engaged upon the differential spring 44 supported upon the plug 51 engaged within the lower end of the sleeve 45.

The piston rings 46 and 47 within peripheral recesses of the shell 41 divert the entire flow of pressure fluid through the plunger chamber 41a when the valve is open, as in Fig. 12; the closed position of the valve being when the rod 40 is raised until the slide valve 49 covers the pressure fluid intake port 50b.

Operation, Fig. 12

This second modified construction being the same as is illustrated in Fig. 7 above the line a—b, only the differential valve mechanism will be discussed here.

The path of pressure fluid through the open device and into the tubing 54 will be via the lateral openings 40b, the plunger chamber 41a, the metering chamber 41b, the passage 41f, the lateral openings 41e, the annular recess 41d, and the intake port 50b.

During high differentials, the differential spring 44 will be compressed, causing the plunger valve 42a to engage the closure seat 41c; thereby cutting off the entrance of pressure fluid until the recurrence of lower differentials will cause the valve to open again.

When the guide pin 22 is engaged within the shallow upper pin pocket 21a the slide valve 49 will close the pressure fluid intake port 50b.

While I have shown the guide pin stationary and the actuator movable, it is apparent that the pockets and inclined cam surfaces of the actuator may be placed in the stationary shell and that the guide pin may be transferred from the shell to the movable actuator, either construction being considered the full equivalent of the other. It is also apparent that the position of the pin pockets and the direction of the inclined cam surfaces of the actuators may be reversed; also that the same changes may be made in the operating tool 52, in which event the slots 52b and 52h would be moved accordingly.

It is understood that all references to positions and directions such as "upper" and "lower," "upward" and "downward," "above" and "below" apply to the device as illustrated in the accompanying drawings and that such references are made for convenience of description only without expressed or implied limitations upon the invention or its other applications.

It is obvious that many other mechanical changes, substitutions, and adaptations may be made in the construction and that equivalents may be substituted for the parts shown; and I reserve the right to make such mechanical changes, substitutions, and adaptations within the scope of the invention as herein disclosed, as well as to apply it to various modified and other uses.

I claim:

1. In a differential flow device adapted to be remotely controlled through a string of tubing: a nipple adapted to be connected into said tubing; a lateral shell on said nipple, said nipple and shell having adjoining walls formed with a slot and a pressure fluid intake port, said slot and port communicating between the interiors of said nipple and shell, said shell also having an intake passage communicating with said intake port and formed with a closure seat therearound; an actuator pin housing slidable in said shell; an actuator secured upon said housing and having an opening around the periphery thereof, said opening forming, two upper and two lower opposed helically inclined cam surfaces in spaced and offset relation to each other, two upper pockets, one deep and the other shallow, alternating between said upper cam surfaces, and two lower pockets alternating between said lower cam surfaces, said actuator being slidable in said shell, and rotatable relative to said housing; an actuator spring urging said actuator and housing downward in said shell; an actuator pin in said housing and extending slightly into said nipple, said pin being slidable in said slot; means movable through said nipple for operatively engaging said actuator pin; a plunger in spaced relation to said seat and adapted to engage said seat to close said passage; a differential spring resiliently urging said plunger away from said seat; a check valve in said passage; and a guide pin in said shell, said pin extending into said opening and being adapted to alternately engage within one of said pockets and upon one of said cam surfaces to cause partial rotation of said actuator each time said actuator is reciprocated a predetermined distance so as to resiliently affect the opening of said differential valve when said guide pin is engaged within said deep upper pocket and affect the closing of same when said guide pin is engaged within said shallow upper pocket.

2. In a differential flow device adapted to be remotely controlled through a string of tubing: a nipple adapted to be connected into said tubing; a lateral shell on said nipple, said nipple and shell having adjoining walls formed with a slot communicating between the interiors of said nipple and shell; an actuator pin housing slidable in said shell; an actuator upon said housing and having a peripheral opening therearound, said opening forming, two upper and two lower opposed helically inclined cam surfaces in spaced and offset relation to each other, two upper pockets, one deep and the other shallow, alternating between said upper cam surfaces, and two lower pockets alternating between said lower cam surfaces, said actuator being slidable in said shell and rotatable relative to said housing; an actuator spring urging said actuator and housing downward in said shell; an actuator pin in said housing and extending slightly into said nipple, said pin being slidable in said slot; means movable through said nipple for operatively engaging said actuator pin, a valve housing on said nipple and having a pressure fluid passage extending through a portion thereof, said passage communicating with the interior of said nipple, said valve housing being aligned with and in spaced relation to said shell; a ball valve in said passage, said valve being adapted in two positions thereof to close said passage; a valve control rod on said actuator pin housing, said rod being slidable hermetically through one end of said shell; a tubular extension upon said rod, said extension being slidable in said valve housing; a valve stop rod in said extension and limitedly slidable therein; a differential spring in said extension and resiliently urging said stop rod into spaced relation to said ball valve; and a guide pin in said shell, said pin extending into said opening and being adapted to alternately engage within one of said pockets and upon one of said cam surfaces to cause partial rotation of said actuator each time said actuator is reciprocated a predetermined distance so as to resiliently affect the opening of said differential valve when said guide pin is engaged within said deep upper pocket and affect the closing of same when said guide pin is engaged within said shallow upper pocket.

3. In a differential flow device adapted to be remotely controlled through a string of tubing: a nipple adapted to be connected into said tubing and having a pressure fluid intake port; a lateral shell on said nipple, said nipple and shell having adjoining walls formed with a slot communicating between the interiors of said nipple and shell; an actuator pin housing slidable in said shell; an actuator upon said housing and having a peripheral opening therearound, said opening forming, two upper and two lower opposed and oppositely inclined cam surfaces in spaced and offset relation to each other, two upper pockets, one deep and the other shallow, alternating between said upper cam surfaces, and two lower pockets alternating between said lower cam surfaces; said actuator being slidable in said shell and rotatable relative to said housing; an actuator spring urging said actuator and housing downward in said shell; an actuator pin in said housing and extending slightly into said nipple, said pin being slidable in said slot; means movable through said nipple for operatively engaging said actuator pin; a cylinder on said nipple, said cylinder being aligned with and in spaced relation to said shell; a valve control rod on said housing; a tubular extension on said rod and having one or more openings; a plunger housing shell on said extension, said plunger housing shell having a passage for pressure fluid, said passage communicating between said openings and said pressure fluid intake port; a differential spring housing sleeve upon said plunger housing shell; a slide valve between said sleeve and housing shell; a differential spring in said housing sleeve; a closure seat in said passage; a plunger in said passage, said plunger being adapted to engage said seat to close said passage; means for supporting said plunger upon said spring and in spaced relation to said seat; and a guide pin in said shell, said pin extending into said opening and being adapted to alternately engage within one of said pockets and upon one of said cam surfaces to cause partial rotation of said actuator each time said actuator is reciprocated a predetermined distance so as to resiliently affect the spacing of said plunger from said seat when said guide pin is engaged within said deep upper pocket and affect the closing of same upon said seat when said guide pin is engaged within said shallow upper pocket.

4. In a differential flow device adapted to be remotely controlled through a string of tubing: a nipple adapted to be connected into said tubing; a lateral shell on said nipple, said nipple and shell having adjoining walls formed with a slot communicating between the interiors of said nipple and shell; an actuator pin housing slidable in said shell; an actuator secured upon said housing and having a peripheral opening thereabout, said opening forming, two upper and two lower opposed and oppositely inclined cam surfaces in spaced and offset relation to each other, two upper pockets, one deep and the other shallow, alternating between said upper cam surfaces, and two lower pockets alternating between said lower cam surfaces, said actuator being slidable in said shell and rotatable relative to said housing; an actuator spring urging said actuator and housing downward in said shell; an actuator pin in said housing and extending slightly into said nipple, said pin being slidable in said slot; means movable through said nipple for operatively engaging said actuator pin; differential valve means in said shell for admitting pressure fluid into said tubing during low differentials and excluding such fluid during relatively high differentials; check valve means coefficient with said differential valve means in said shell; and a guide pin in said shell, said pin extending into said opening and being adapted to be alternately engaged within one of said pockets and upon one of said cam surfaces to cause partial rotation of said actuator each time said actuator is reciprocated a predetermined distance so as to resiliently affect the opening of said valve means when said guide pin is engaged within said deep upper pocket and affect the closing of same when said guide pin is engaged within said shallow upper pocket.

5. In a differential flow device adapted to be remotely controlled through a string of tubing: a nipple adapted to be connected into said tubing; a lateral shell on said nipple, said nipple and shell having adjoining walls formed with a slot communicating between the interiors of said nipple and shell; an actuator pin housing slidable in said shell; an actuator upon said housing and having a peripheral opening therearound, said opening forming, two upper and two lower opposed and oppositely inclined cam surfaces in spaced and offset relation to each other, two upper pockets, one deep and the other shallow, alternating between said upper cam surfaces, and two lower pockets alternating between said lower cam surfaces, said actuator being slidable in said shell and rotatable relative to said housing; an actuator spring urging said actuator and housing downward in said shell; an actuator pin in said housing and extending slightly into said nipple; said pin being slidable in said slot; means movable through said nipple for operatively engaging said actuator pin; differential valve means for admitting pressure fluid into said tubing during low differentials and excluding such fluid during relatively high differentials, said means being coefficient with said housing; and a guide pin in said shell, said pin extending into said opening and being adapted to be alternately engaged within one of said pockets and upon one of said cam surfaces to cause partial rotation of said actuator each time said actuator is reciprocated a predetermined distance so as to resiliently affect the opening of said differential valve when said guide pin is engaged within said deep upper pocket and affect the closing of same when said guide pin is engaged within said shallow upper pocket.

6. In a differential flow device adapted to be remotely controlled through a string of tubing: a nipple adapted to be connected into said tubing and having a pressure fluid intake port; a lateral shell on said nipple; an actuator pin housing slidable in said shell; an actuator upon said housing and rotatable relative thereto in said shell, said actuator being formed with oppositely sloping helically inclined opposed cam surfaces in offset relation to each other, and an equal number of pockets, one deep and the others shallow alternating between said cam surfaces; an actuator pin on said housing, said pin being operable from within said nipple to move said actuator and housing in one direction; means movable through said nipple to operate said pin; an actuator spring in said shell, said spring resiliently urging said actuator and housing in the opposite direction; a guide pin coefficient with said cam surfaces and pockets; members supported by said shell providing a passage communicating with said pressure fluid intake port; and a spring loaded differential valve in said passage, said valve controlling said passage and being normally open when said guide pin is engaged within said deep pocket and always closed when said guide pin is engaged within the uppermost of said shallow pockets.

7. In a differential flow device adapted to be remotely controlled through a string of tubing: a nipple adapted to be connected into said tubing and having a pressure fluid intake port; a shell on said nipple, said nipple and shell having adjoining walls formed with a slot communicating between the interiors of said nipple and shell; an actuator pin housing slidable in said shell; an actuator also slidable in said shell and rotatable relative to said housing, said actuator having a peripheral opening therearound forming opposed and offset helically inclined cam surfaces and pockets between said cam surfaces, one of said pockets being deep and the others shallow; an actuator pin in said housing and slidable in said slot; means movable through said nipple to operate said pin; a guide pin in said shell, said pin being engageable within said peripheral opening of said actuator; a differential spring proximate said nipple; members supported by said shell providing a passage communicating with said pressure fluid intake port, said passage having a closure seat; and a differential valve adapted to engage said seat and close said passage, said valve being normally spaced from said seat by said spring.

8. In a differential flow device adapted to be remotely controlled through a string of tubing: a nipple adapted to be connected into said tubing and having a pressure fluid intake port; a shell thereon, said nipple and shell having adjoining walls formed with a slot communicating between the interiors of said nipple and shell; an actuator pin housing slidable in said shell; an actuator rotatably secured upon said housing and also slidable in said shell, said actuator being formed with oppositely inclined opposed sloping cam surfaces in offset relation to each other upon the periphery of said actuator, and pockets opposed to said cam surfaces, one deep and the others shallow; an actuator pin in said housing and slidable in said slot; means movable through said nipple to operate said pin; a valve control rod on said housing and hermetically slidable through one end of said shell; a valve housing on said nipple and having a passage for pressure fluid through a portion of said valve housing, said passage communicating with said pressure fluid intake port; an extension on said rod, said extension being slidable in said valve housing; a valve in said passage; means for resisting said valve in moving to close said passage while said actuator is in its lower position; and a guide pin adapted to secure said actuator in said lower position when said guide pin is engaged in said deep pocket and in its upper position while engaged within one of said shallow pockets.

9. In a differential flow device; a string of tubing; a differential valve located in the tubing; means for operating said valve, said means including an actuator movable in the tubing for effecting operation of said valve, said actuator comprising a cylinder having a peripheral opening therearound, said opening forming: two upper and two lower opposed helically inclined cam surfaces in spaced and offset relation to each other, two upper pockets, one deep and the other shallow, alternating between said upper cam surfaces, and two lower pockets alternating between said lower cam surfaces.

10. In a differential flow device wherein is provided a differential valve, means for operating said valve, and an actuator assembly, said assembly comprising: an actuator assembly functioning to operate said valve operating means and pin housing; an actuator thereon and rotatable relative thereto; an actuator pin in said housing; a differential spring in said housing; a spring support upon one end of said housing; and a sleeve slidable through said support and engageable with one end of said spring.

11. In a differential flow device wherein is provided a differential valve, means for operating said valve, and an actuator assembly, said assembly comprising: an actuator pin housing; an actuator thereon and rotatable relative thereto; an actuator pin in said housing; a valve control rod on said housing; a tubular extension on said rod; a differential spring in said extension; and a valve stop rod slidably secured in said extension, said stop rod being adapted to compress said spring.

12. In a remotely controlled flow device wherein an actuator assembly is operatively connected with a flow valve and means are provided for operating the actuator, said actuator assembly comprising: an actuator assembly functioning to operate said valve operating means and pin housing; an actuator thereon and rotatable relative thereto; an actuator pin in said housing; a valve control rod on said housing; a tubular extension on said rod, said extension having openings and a passage communicating therewith; a plunger housing shell on said extension and formed with lateral openings having communication with said passage; a differential spring housing upon said extension proximate said lateral openings; a differential spring in said spring housing; a valve seat in said passage; a plunger in said passage; a valve on said plunger, said valve being engageable with said seat to close said passage; and means coefficient between said plunger and spring to normally space said valve from said seat.

13. In combination: a well tubing having a flow passage for well fluid and formed with at least one pressure fluid intake port; a flow valve associated with said port for controlling the flow of pressure fluid therethrough, said flow valve being carried by the tubing exteriorly thereof, and including an actuating member projecting into said flow passage; and a cable operated tool in said flow passage, said tool being formed with a peripheral opening providing passages for the movement of said tool past said actuating member in one direction without effectively moving said actuating member, said opening also providing cam surfaces adapted to cooperate with said actuating member upon movement of said tool in the opposite direction to partially rotate said tool and cause same to operatively engage said actuating member on a subsequent movement in the reverse direction.

14. In combination: a well tubing having a flow passage for well fluid and a pressure fluid intake port spaced longitudinally of said tubing; a flow valve associated with said port for controlling the flow of pressure fluid therethrough, said flow valve being carried by the tubing exteriorly thereof, and including an actuating member projecting into said flow passage; and a cable operated tool in said flow passage, said tool being formed with a peripheral opening providing passages for the upward movement of said tool past said actuating member without effectively moving said actuating member, said opening also providing cam surfaces adapted to cooperate with said actuating member upon downward movement of said tool to partially rotate said tool to cause same to operatively engage said actuating member on a subsequent upward movement of said tool.

15. In a remotely controlled flow device, the combination of a tubing having an inlet port, said port being controlled by a spring loaded differential valve; means for varying the resistance to the closing of said valve, said valve being operable by pressure fluid exterior of said tubing to close said valve at a predetermined differential; and means operable through said tubing for remotely controlling said resistance varying means, and wholly removable from the tubing after each operation without disturbing the setting of the controlled means.

16. In a remotely controlled flow device: a nipple; a shell thereon; a spring loaded step-by-step operating actuator assembly located in said shell; means within said shell for alternately and resiliently securing said assembly in either of two positions; an actuator pin; means operable through said nipple for operatively moving said actuator pin; a member providing an intake passage for pressure fluid into said nipple; and valves controlling said passage, said valves being positionally coefficient with the spring of said assembly so that one of said valves will be seated in one position of said assembly and the other of said valves will be resisted in seating in the other position of said assembly.

17. In a remotely controlled flow device: a nipple; a lateral shell on said nipple; a member having a passage, with two-way valve seats, for passage of fluid to said nipple; a two-way acting valve device for cooperating with said valve seats; a spring loaded means cooperating with said valve device in controlling passage of fluid through said member; means for effecting compression of the spring of said spring loaded means to free said valve device to act under differential pressures, means operable through said nipple for operating said last named means; and a step-by-step acting means located within said shell in cooperative relation to said spring loaded means and in a position to free said valve or in a position to act on said valve.

18. In a remotely controlled flow device: a nipple; a lateral shell on said nipple; a member having a passage, with two-way valve seats, for passage of fluid to said nipple; a two-way acting valve device for cooperating with said valve seats; a non-rotatable spring loaded means cooperating with said valve device in controlling passage of fluid through said member; means for effecting compression of the spring of said spring loaded means to free said valve device to act under differential pressures; means operable through said nipple for operating said last named means and a rotatable step-by-step acting means located within said shell in cooperative relation to said spring loaded means for alternately effecting the securing of said spring loaded means in a position to free said valve or in a position to act on said valve.

19. In combination: a well tubing having a flow passage and being formed with at least one pressure fluid intake port; and a flow valve cooperative with the same, the flow valve being carried by said tubing exteriorly thereof and proximate its pressure fluid intake port, said flow valve including a valve member and a metering chamber for graduating the flow of pressure fluid; and remotely controlled manual means for opening and closing said valve.

20. In combination: a well tubing having a flow passage and being formed with at least one pressure fluid intake port; and a flow valve cooperative with the same, the flow valve being carried by said tubing externally thereof and proximate its pressure fluid intake port, said flow valve including a valve member and a metering chamber for graduating the flow of pressure fluid; and remotely controlled manual means for opening and closing said valve, said last named means including a rotatable actuator and means cooperative with said actuator for positively holding said valve member in either its open or its closed position at will.

21. In combination: a well tubing having a flow passage and being formed with at least one pressure fluid intake port; and a flow valve cooperative with the same, the flow valve being carried by said tubing externally thereof and proximate its pressure fluid intake port, said flow valve including a valve member and a metering chamber for graduating the flow of pressure fluid; and remotely controlled manual means for opening and closing said valve, said last named means including a rotatable and longitudinally movable actuator carrying said valve member, and means cooperative with said actuator to hold said valve in either its open or its closed position.

22. In combination: a well tubing having a flow passage and being formed with at least one pressure fluid intake port; and a flow valve cooperative with the same, the flow valve being carried by said tubing externally thereof and proximate its pressure fluid intake port, said flow valve including a valve member; and means including a rotatable actuator and means cooperative therewith for positively holding said valve member in either its open or its closed position at will.

23. In combination: a well tubing having a flow passage and being formed with at least one pressure fluid intake port; and a flow valve cooperative with the same, the flow valve being carried by said tubing externally thereof and proximate its pressure fluid intake port, said valve including a valve member; and means including a spring loaded rotatable actuator and means cooperative therewith for holding said valve member in either its open or its closed position at will.

24. A flow valve for controlling the flow of pressure fluid through a pressure fluid intake port in a well tubing, said valve being adapted to be mounted exteriorly of said tubing and comprising: a valve member to be moved to either opened or closed position; an actuator for said valve member, said actuator having means for securing said valve member against being moved while in either of its open or closed positions; and means cooperative with said actuator for yieldably holding said actuator in its valve member securing positions.

25. In combination: a well tubing formed with a pressure fluid intake port; a flow valve carried by said tubing exteriorly thereof and proximate said intake port, said valve including a spring loaded valve member normally held in its open position and adapted to be closed by changes in pressure differential; a reciprocatable body carrying said valve member and its spring; remotely controlled manual means for moving said body to effect the closing and opening of said valve; and means cooperative with said remotely controlled manual means and said body for securing said body in either of its extremities to which it may be moved.

26. The system of flowing wells which includes a casing provided with a supply of lifting fluid; a single string of tubing; a normally open lifting fluid inlet valve mounted on and communicating with the tubing for admitting lifting fluid from the casing to the tubing; means for locking and unlocking said valve; and means operable from the top of the well for setting said locking and unlocking means and capable of removal from the well thereafter without affecting the setting of said locking and unlocking means, said valve having elements responsive to differentials between the well fluid and the lifting fluid and operable when the valve is locked in its normal position.

ALEXANDER BOYNTON.